(12) United States Patent
Herman et al.

(10) Patent No.: US 12,307,790 B2
(45) Date of Patent: May 20, 2025

(54) STEERING WHEEL CONTACT DETECTION

(71) Applicant: Ford Global Technologies, LLC, Dearborn, MI (US)

(72) Inventors: David Michael Herman, West Bloomfield, MI (US); Yashanshu Jain, Dearborn, MI (US); Ryan Sorsby, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 348 days.

(21) Appl. No.: 17/929,042

(22) Filed: Sep. 1, 2022

(65) Prior Publication Data

US 2024/0078819 A1 Mar. 7, 2024

(51) Int. Cl.
| | |
|---|---|
| *G06V 20/64* | (2022.01) |
| *B62D 6/10* | (2006.01) |
| *G06T 7/50* | (2017.01) |
| *G06T 7/70* | (2017.01) |
| *G06V 20/59* | (2022.01) |
| *G06V 40/18* | (2022.01) |

(52) U.S. Cl.
CPC ............. *G06V 20/59* (2022.01); *B62D 6/10* (2013.01); *G06T 7/50* (2017.01); *G06T 7/70* (2017.01); *G06V 20/64* (2022.01); *G06V 40/18* (2022.01); *G06T 2207/10028* (2013.01); *G06T 2207/30201* (2013.01); *G06T 2207/30268* (2013.01)

(58) Field of Classification Search
CPC ........ G06V 20/59; G06V 20/64; G06V 40/18; G06V 20/593; B62D 6/10; B62D 15/025; B62D 1/046; B62D 15/00; G06T 7/50; G06T 7/70; G06T 2207/10028; G06T 2207/30201; G06T 2207/30268; G06T 2207/10012; G06T 2207/20081; G06T 2207/20084; B60R 1/29; B60R 16/02; B60R 2300/105; B60R 2300/8006
USPC .................................................. 382/104, 274
See application file for complete search history.

(56) References Cited

U.S. PATENT DOCUMENTS

| | | | |
|---|---|---|---|
| 10,502,616 B2 | 12/2019 | Clochard | |
| 11,100,347 B2 | 8/2021 | Herman | |
| 11,334,754 B2* | 5/2022 | Kim | G06V 40/171 |
| 11,654,898 B2* | 5/2023 | Seo | B60Q 9/00 |
| | | | 701/23 |
| 2004/0195031 A1* | 10/2004 | Nagasaka | G06F 3/0418 |
| | | | 180/271 |
| 2013/0024071 A1* | 1/2013 | Sivertsen | G06F 3/041 |
| | | | 701/41 |
| 2016/0116588 A1* | 4/2016 | Fukuman | G01S 15/931 |
| | | | 367/93 |
| 2017/0106892 A1* | 4/2017 | Lisseman | B60W 40/09 |
| 2018/0335340 A1* | 11/2018 | Clochard | G01J 1/0238 |

(Continued)

FOREIGN PATENT DOCUMENTS

EP 3663154 A1 6/2020

*Primary Examiner* — Negussie Worku
(74) *Attorney, Agent, or Firm* — Frank Lollo; Brooks Kushman P.C.

(57) ABSTRACT

An object can be detected in contact with a steering wheel of a vehicle. A first image of the steering wheel at a first angle of rotation and a second image of the steering wheel at a second angle of rotation are then obtained. A type of the object is identified based on at least one of the first image or the second image, as one of a human hand or a foreign object. A vehicle component is controlled based on the type of object.

20 Claims, 6 Drawing Sheets

(56) References Cited

U.S. PATENT DOCUMENTS

| | | | |
|---|---|---|---|
| 2019/0025824 A1* | 1/2019 | Odate | B62D 1/046 |
| 2019/0054954 A1* | 2/2019 | Clochard | B62D 1/06 |
| 2019/0266743 A1* | 8/2019 | Matsuura | G06V 40/161 |
| 2020/0369316 A1* | 11/2020 | Tsubaki | B62D 5/0493 |
| 2021/0107505 A1* | 4/2021 | Matsunaga | G01S 15/931 |
| 2021/0107527 A1* | 4/2021 | Karve | B62D 1/06 |
| 2023/0206650 A1* | 6/2023 | Chen | B60W 30/0956 |
| | | | 701/28 |
| 2024/0375664 A1* | 11/2024 | Herman | G06V 20/597 |

* cited by examiner

STEERING WHEEL CONTACT DETECTION

BACKGROUND

A contact sensor such as a capacitive sensor can be included in or on a vehicle steering wheel to determine if a user's hand is in contact with the steering wheel. However, the contact sensor detects at most whether electrically conductive object is in contact with the steering wheel.

DETAILED DESCRIPTION

Figure 1:
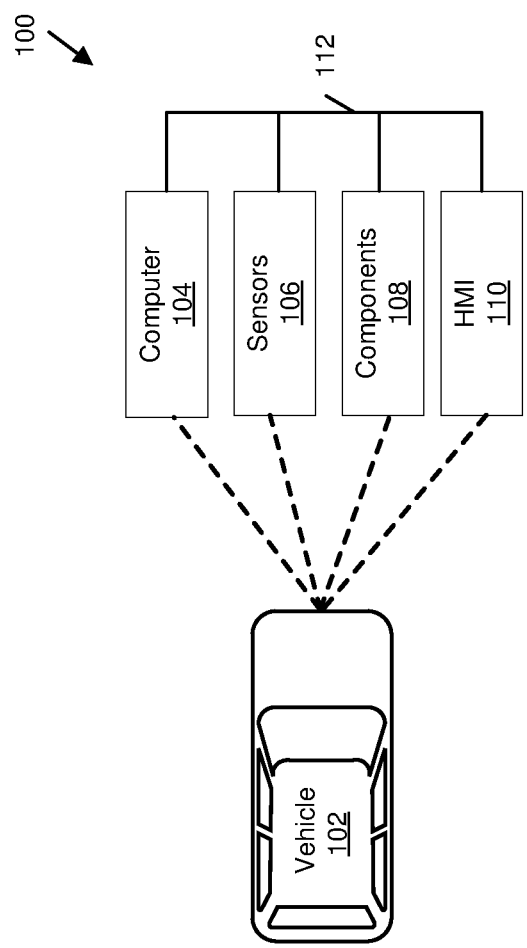
FIG. 1 is a block diagram of an example steering wheel object contact detection system.

As disclosed herein, a computer in a vehicle can output a prediction or determination whether an object in contact with a steering wheel in the vehicle is a human hand or some other object. The computer can receive data from a steering wheel sensor, e.g., a capacitive sensor or the like in or on the vehicle steering wheel, indicating that an object is in contact with the steering wheel. The computer can receive further data, i.e., image data, from one or more cameras in the vehicle. Angles of rotation of the steering wheel can be determined based on the image data. For example, the computer could determine a first steering wheel angle of rotation from a first image and a second steering wheel angle of rotation from a second image. Further, a type of the object could be identified as a human hand or some other object (referred to herein as a "foreign" object) from one or both of the first or second images. The vehicle may then be controlled based on the type of object. For example, if the object is a foreign object, the vehicle computer may output a message to a user and/or could take other control options such as limiting a vehicle speed, providing a haptic output via a vehicle steering wheel or seat, etc.

Accordingly, a system comprises a processor and a memory, the memory storing instructions executable by the processor such that the processor is programmed to detect an object in contact with a steering wheel of a vehicle; obtain a first image of the steering wheel at a first angle of rotation and a second image of the steering wheel at a second angle of rotation; identify a type of the object, based on at least one of the first image or the second image, as one of a human hand or a foreign object; and control a vehicle component based on the type of object.

The processor can be further programmed to identify the type of the object based on a depth estimate of the object. The processor can be further programmed to obtain the depth estimate of the object by determining a surface normal of the steering wheel from by combining the first image and the second image. The processor can be further programmed to identify the type of the object based on data from one or both of a steering wheel torque sensor and a potentiometer.

The processor can be further programmed to control the vehicle component based on data about a current user of the vehicle. The data about the current user of the vehicle can be eye gaze data. The data about the current user of the vehicle can alternatively or additionally be operator profile data.

The processor can be further programmed to receive the first image provided from a first camera and the second image provided from a second camera. At least one of the first image or the second image can be provided from a radar and/or a lidar.

A contact sensor can be arranged to provide a signal indicating that the object is in contact with the steering wheel.

The processor can be further programmed to, upon identifying the type of object as the human hand, control the vehicle component based on a position of the human hand with respect to a landmark on the steering wheel.

The processor can be further programmed to identify the type of the object based on both of the first image and the second image.

A method comprises detecting an object in contact with a steering wheel of a vehicle; obtaining a first image of the steering wheel at a first angle of rotation and a second image of the steering wheel at a second angle of rotation; identifying a type of the object, based on at least one of the first image or the second image, as one of a human hand or a foreign object; and controlling a vehicle component based on the type of object.

The method can further comprise identifying the type of the object based on a depth estimate of the object. The method can further comprise obtaining the depth estimate of the object by determining a surface normal of the steering wheel from by combining the first image and the second image. The method can further comprise identifying the type of the object based on data from one or both of a steering wheel torque sensor and a potentiometer.

The method can further comprise controlling the vehicle component based on data about a current user of the vehicle. The method can further comprise receiving the first image from a first camera and the second image from a second camera. The method can further comprise identifying the type of the object based on both of the first image and the second image.

Referring to FIG. 1, a steering wheel object contact detection system 100 can include a vehicle 102 and elements therein. A vehicle 102 may be any suitable type of ground vehicle, e.g., a passenger or commercial automobile such as a sedan, a coupe, a truck, a sport utility, a crossover, a van, a minivan, a taxi, a bus, etc. The vehicle 102 can include a vehicle computer 104 various sensors 106, subsystems or components 108, including a human machine interface (HMI) that communicate on a vehicle network 110.

The vehicle computer 104 includes a processor and a memory. The memory includes one or more forms of computer readable media, and stores instructions executable by the vehicle computer 104 for performing various operations, including as disclosed herein. For example, a vehicle computer 104 can be a generic computer with a processor and memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor 106 data and/or communicating the sensor 106 data. In another example, a vehicle computer 104 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components 108 inside an FPGA may be configured based on VHDL programming, e.g. stored in a memory electrically connected to the FPGA circuit. In some examples, a combination of processor(s), ASIC(s), and/or FPGA circuits may be included in a computer 104.

The memory can be of any type, e.g., hard disk drives, solid state drives, servers, or any volatile or non-volatile media. The memory can store the collected data sent from the sensors 106. The memory can be a separate device from the computer 104, and the computer 104 can retrieve information stored by the memory via a network in the vehicle 102, e.g., over a CAN bus, a wireless network, etc. Alternatively or additionally, the memory can be part of the computer 104, e.g., as a memory of the computer 104. The computer 104 may include programming to operate one or more of vehicle 102 brakes, propulsion e.g., control of acceleration in the vehicle 102 by controlling one or more of an internal combustion engine, electric motor, hybrid engine, etc., steering, climate control, interior and/or exterior lights, etc., as well as to determine whether and when the computer 104, as opposed to a human operator, is to control such operations. Additionally, the computer 104 may be programmed to determine whether and when a human operator is to control such operations.

The computer 104 may include or be communicatively coupled to, e.g., via a vehicle network 110 such as a communications bus as described further below, more than one processor, e.g., included in components 108 such as sensors 106, electronic control units (ECUs) or the like included in the vehicle 102 for monitoring and/or controlling various vehicle components, e.g., a powertrain controller, a brake controller, a steering controller, etc. The vehicle computer 104 described herein could include a plurality of devices, e.g., ECUs or the like, for performing operations described herein to the vehicle computer 104. Therefore, alternatively or additionally, in cases where the computer 104 actually comprises a plurality of devices, the vehicle 102 communication network may be used for communications between devices represented as the computer 104 in this disclosure. Further, as mentioned below, various controllers and/or sensors 106 may provide data to the computer 104 via the vehicle 102 communication network.

The vehicle 102 typically includes a variety of sensors 106. A sensor 106 is a device that can obtain one or more measurements of one or more physical phenomena. Some sensors 106 detect internal states of the vehicle 102, for example, wheel speed, wheel orientation, and engine and transmission variables. Some sensors 106 detect the position or orientation of the vehicle 102, for example, global positioning system GPS sensors 106; accelerometers such as piezo-electric or microelectromechanical systems MEMS; gyroscopes such as rate, ring laser, or fiber-optic gyroscopes; inertial measurements units IMU; and magnetometers. Some sensors 106 detect the external world and/or vehicle 102 interior, for example, radar sensors 106, scanning laser range finders, light detection and ranging LIDAR devices, and image processing sensors 106 such as cameras 206 (see FIGS. 2-4). A LIDAR device detects distances to objects by emitting laser pulses and measuring the time of flight for the pulse to travel to the object and back. Some sensors 106 are communications devices, for example, vehicle-to-infrastructure V2I or vehicle-to-vehicle V2V devices. Sensor 106 operation can be affected by obstructions, e.g., dust, snow, insects, etc. Often, but not necessarily, a sensor 106 includes a digital-to-analog converter to converted sensed analog data to a digital signal that can be provided to a digital computer 104, e.g., via a digital network such as described herein. Sensors 106 can include a variety of devices, and can be disposed to sense an environment, provide data about a machine, etc., in a variety of ways. For example, a sensor 106 could be mounted to a stationary infrastructure element on, over, or near a road. Moreover, various controllers in a vehicle 102 may operate as sensors 106 to provide data via the vehicle network 110 or bus, e.g., data relating to vehicle 102 speed, acceleration, location, subsystem and/or component 108 status, etc. Further, other sensors 106, in or on a vehicle 102, stationary infrastructure element, etc., infrastructure could include cameras 206, short range radar, long range radar, LIDAR, and/or ultrasonic transducers, weight sensors 106, accelerometers, motion detectors, etc., i.e., sensors 106 to provide a variety of data. To provide just a few non-limiting examples, sensor 106 data could include data for determining a position of a component 108, a location of an object, a speed of an object, a type of an object, a slope of a roadway, a temperature, a presence or amount of moisture, eye gaze of the driver, position and/or pose of passengers in a vehicle, a fuel level, a data rate, etc.

Vehicle sensors 106 include one or more cameras 206, which can detect electromagnetic radiation in some range of wavelengths. For example, cameras 206 may detect visible light, infrared radiation, ultraviolet light, or some range of wavelengths including visible, infrared, and/or ultraviolet light. For example, a camera 206 can be a charge-coupled device (CCD), complementary metal oxide semiconductor (CMOS), or any other suitable type. For another example, the sensors 106 may include a time-of-flight TOF camera 206, which include a modulated light source for illuminating the environment and detect both reflected light from the modulated light source and ambient light to sense reflectivity amplitudes and distances to the scene.

Vehicle sensors 106 can further include steering wheel sensors 106, such as a torque sensor 106 that outputs a torque applied to the steering wheel 202, a rotary potentiometer that measures position and could be used to determine an angle of the steering wheel 202, and/or a contact sensor 208. The contact sensor 208 may be any suitable contact sensor such as a capacitive sensor in or on a steering wheel 202 to detect an object contact the steering wheel, i.e., a sensor that detects changes in an electric field caused by proximity to human skin, such as a surface capacitive sensor, a projected capacitive touch sensor such as a mutual capacitive sensor, a self-capacitive sensor, or the like.

The computer 104 may include programming to command one or more actuators to operate one or more vehicle 102 subsystems or components 108, such as vehicle 102 brakes, propulsion, or steering. That is, the computer 104 may actuate control of acceleration in the vehicle 102 by controlling one or more of an internal combustion engine, electric motor, hybrid engine, etc., and/or may actuate control of brakes, steering, climate control, interior and/or exterior lights, etc. The computer 104 may include or be communicatively coupled to, e.g., via a vehicle network 110, more than one processor, e.g., included in components 108 such as sensors 106, electronic control units (ECUs) or the like for monitoring and/or controlling various vehicle components, e.g., ECUs or the like such as a powertrain controller, a brake controller, a steering controller, etc.

The vehicle components may include an HMI 112. The vehicle 102 can include an HMI 112 human-machine interface, e.g., one or more of a display, a touchscreen display, a microphone, a speaker, a haptic actuator, e.g., in a seat or steering wheel 202 of the vehicle 102, etc. The user can provide input to devices such as the computer 104 via the HMI 112. The HMI 112 can communicate with the computer 104 via the vehicle network 110, e.g., the HMI 112 can send a message including the user input provided via a touchscreen, microphone, a camera 206 that captures a gesture, etc., to a computer 104, and/or can display output, e.g., via a screen, speaker, etc.

The vehicle network 110 is a communication network via which messages can be exchanged between various devices, e.g., computers 104, sensors 106, actuators included in components 108, etc., in the vehicle 102. Computer 104 can be generally programmed to send and/or receive, via vehicle network 110, messages to and/or from other devices in vehicle 102 e.g., any or all of ECUs, sensors 106, actuators, components 108, communications module, a human machine interface HMI 112, etc. Additionally or alternatively, messages can be exchanged among various such other devices in vehicle 102 via vehicle network 110. In cases in which computer 104 actually comprises a plurality of devices, vehicle network 110 may be used for communications between devices represented as computer 104 in this disclosure. Further, as mentioned below, various controllers and/or vehicle 102 sensors 106 may provide data to the computer 104. In some implementations, vehicle network 110 can be a network in which messages are conveyed via a vehicle 102 communications bus. For example, vehicle network 110 can include a controller area network CAN in which messages are conveyed via a CAN bus, or a local interconnect network LIN in which messages are conveyed via a LIN bus. In some implementations, vehicle network 110 can include a network in which messages are conveyed using other wired communication technologies and/or wireless communication technologies e.g., Ethernet, WiFi, Bluetooth, etc. Additional examples of protocols that may be used for communications over vehicle network 110 in some implementations include, without limitation, Media Oriented System Transport MOST, Time-Triggered Protocol TTP, and FlexRay. In some implementations, vehicle network 110 can represent a combination of multiple networks, possibly of different types, that support communications among devices in vehicle 102. For example, vehicle network 110 can include a CAN in which some devices in vehicle 102 communicate via a CAN bus, and a wired or wireless local area network in which some device in vehicle 102 communicate according to Ethernet or Wi-Fi communication protocols.

Figure 2:
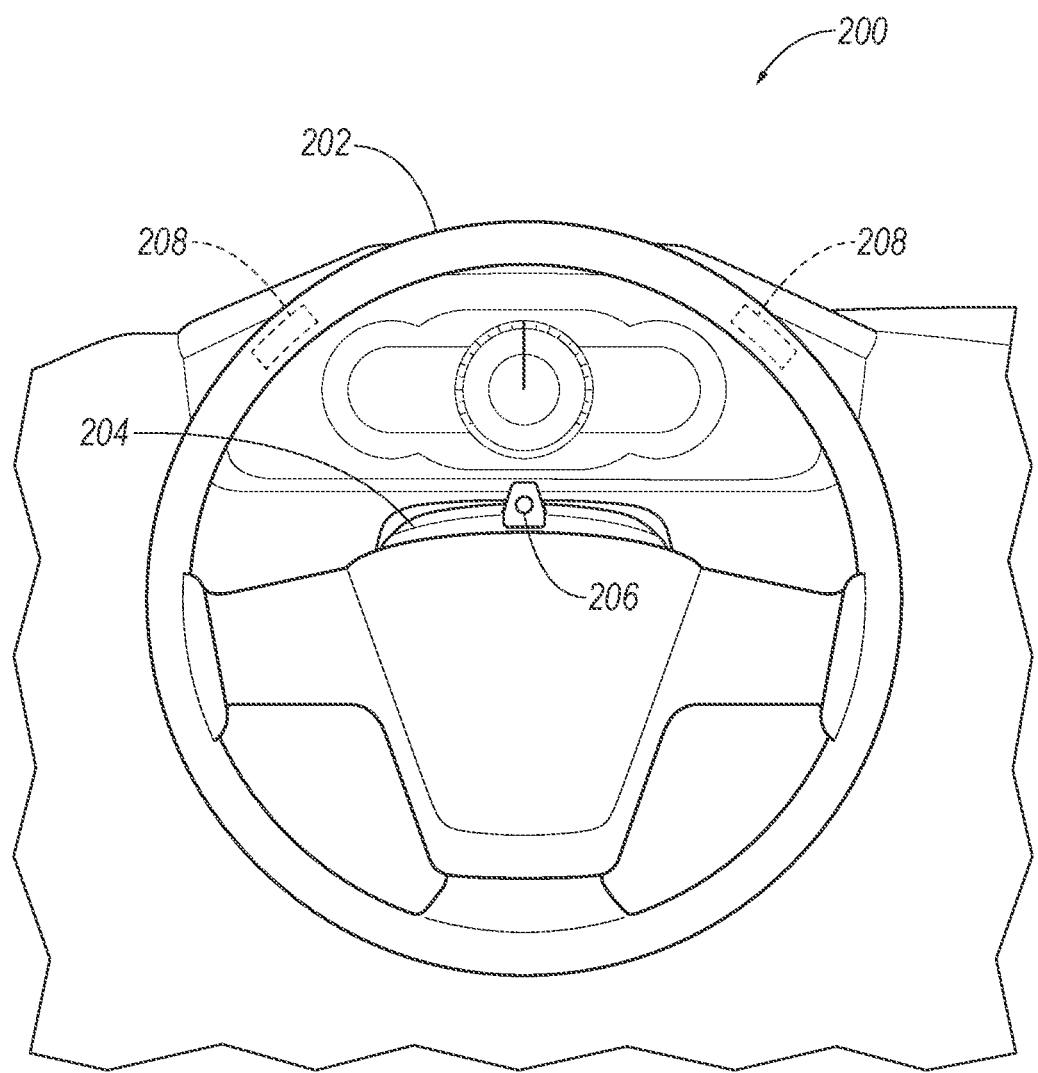
FIG. 2 is a perspective view of an example portion of a vehicle cabin including elements of the steering wheel object contact detection system.

FIG. 2 illustrates a portion of a vehicle cabin 200 including further elements of the detection system 100 in the vehicle 102, including a steering wheel 202 mounted to a steering column 204, and a camera 206 mounted to the steering column 204. Although a single camera 206 is shown in the present figures, multiple cameras 206 may be disposed in a vehicle cabin 200. For example, in addition, or as an alternative, to a camera 206 mounted to a steering column 204, the vehicle cabin 200 may include a camera 206 mounted behind a driver with a forward-facing view that includes a field of view 210 (see FIG. 3) of a vehicle 102 operator and or the steering wheel 202. Yet further alternatively or additionally, a camera 206 could be mounted in or on an interior roof surface, on or proximate to an interior rearview mirror or mirror assembly, etc., whereby a camera 206 alternatively or additionally could provide a side or rear view of a vehicle 102 operator and/or steering wheel 202. Further, one or more contact sensors 208 can be embedded in and/or mounted on the steering wheel 202. Moreover, a steering torque sensor 106 (not shown) is typically provided and can output angles of rotation of a steering wheel 202. A contact sensor 208 and steering torque sensor 106 can provide data to the vehicle computer 104 via the vehicle network 110 as described above.

Figure 3:
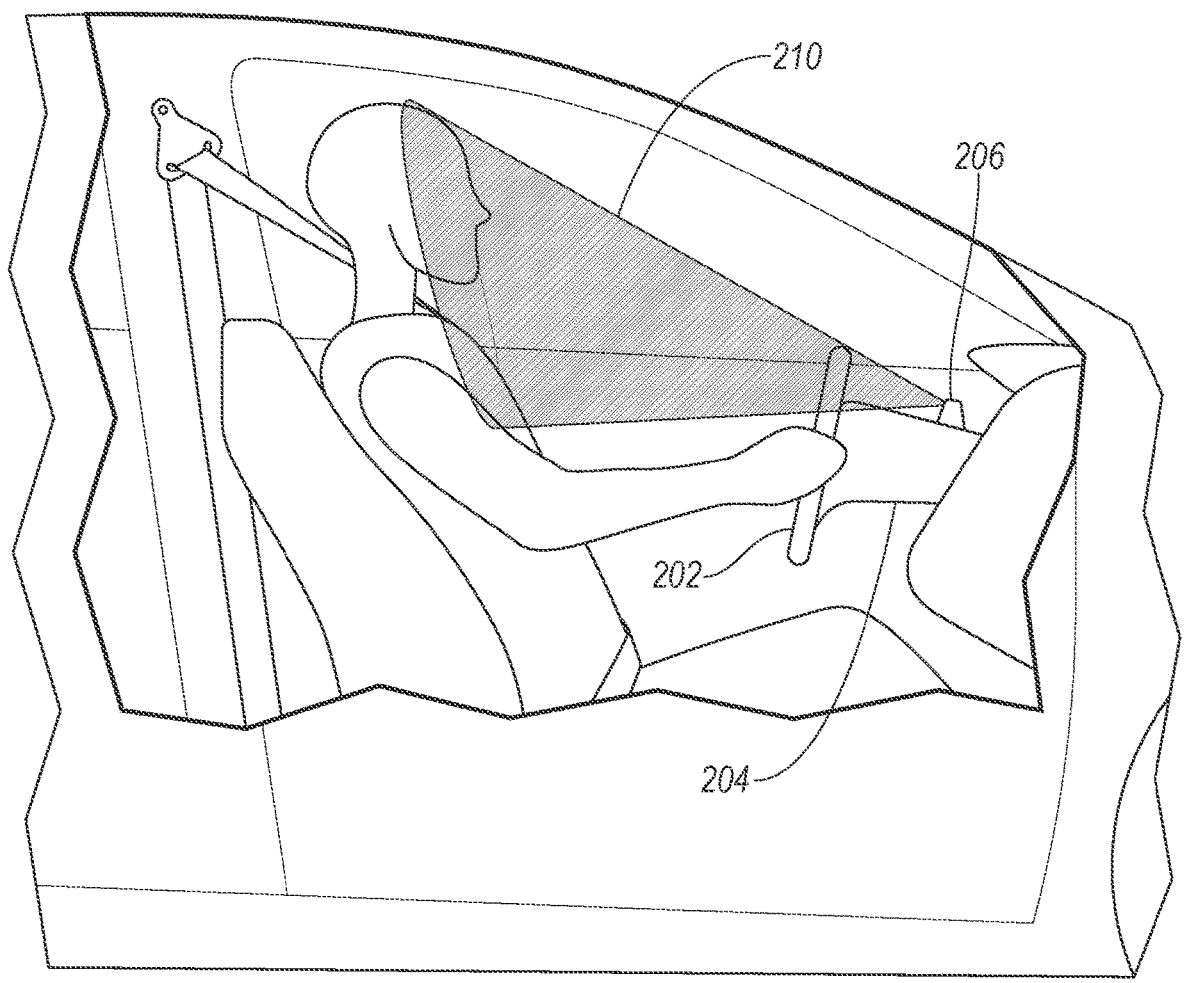
FIG. 3 is a side view of an example portion of a vehicle cabin including elements of the steering wheel object contact detection system.

FIG. 3 illustrates a portion of a vehicle cabin 200 from a side view. As can be seen in FIG. 3, a camera 206 can include a field of view 210 that encompasses a vehicle 102 operator and a portion of the steering wheel 202. As mentioned above, other cameras 206 could alternatively or additionally be disposed in the vehicle cabin 200 and could have different fields of view 210 encompassing the vehicle 102 operator and/or some or all of the steering wheel 202.

Figure 4A:
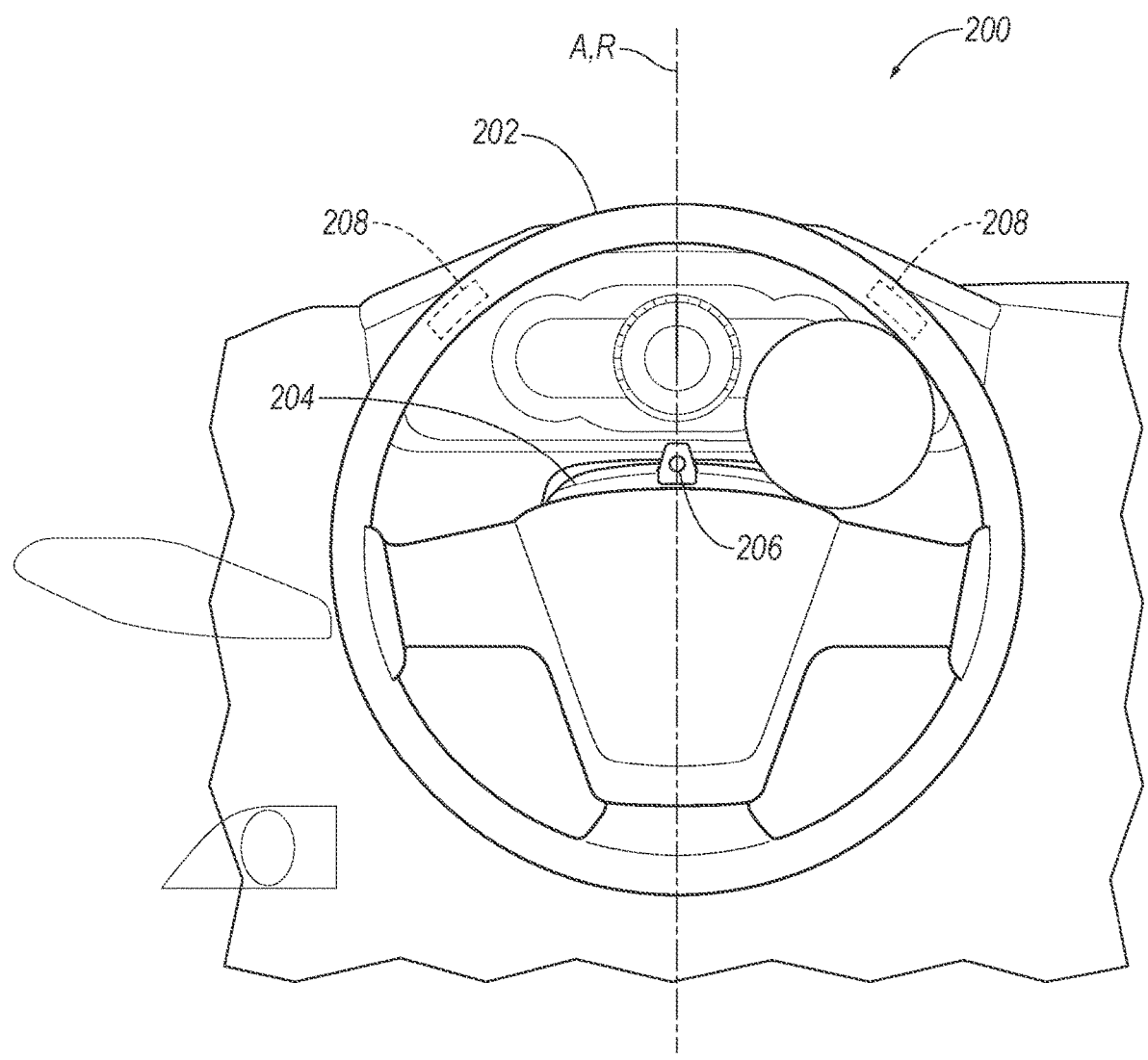
FIGS. 4A and 4B are further perspective views of an example steering wheel object contact detection system, including a steering wheel with a foreign object in contact therewith and at first and second angles of rotation.
Figure 4B:
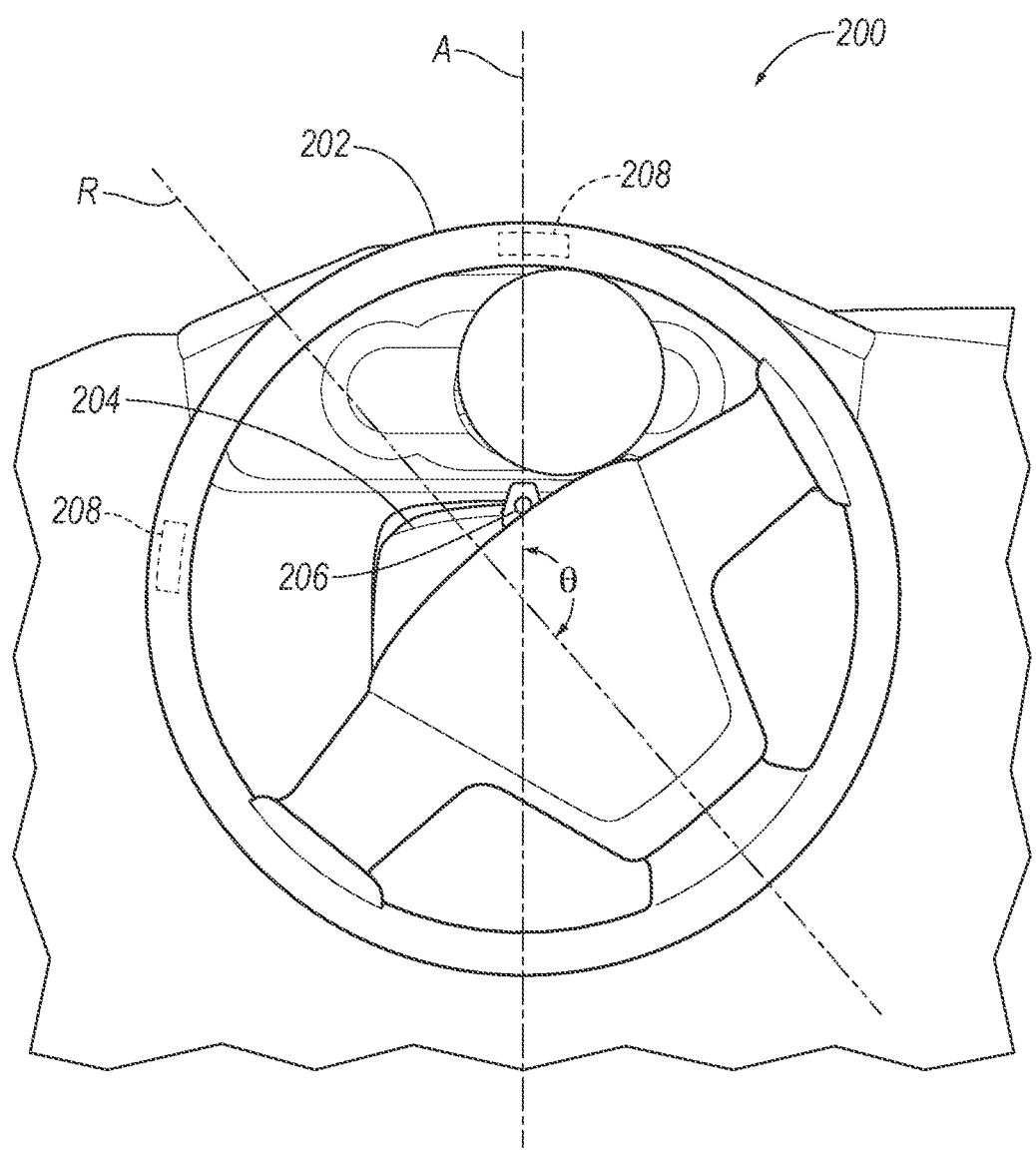

FIGS. 4A and 4B are further perspective views of an example steering wheel 202 object contact detection system 100, including a steering wheel 202 with a foreign object in contact therewith and at first and second angles of rotation. For example, an angle of rotation with respect to a specified axis, such as a vertical axis A, can be determined from output of a steering wheel 202 torque sensor 106, and/or based on interpreting images from one or more cameras 206. In FIG. 4A, the steering wheel 202 is shown at a zero angle of rotation, such that the vertical axis A and an axis of rotation R are a same axis. In FIG. 4B, the steering wheel 202 is shown at a non-zero angle of rotation such that there is an angle of rotation between the vertical axis A and the axis of rotation R.

The vehicle 102 computer 104 comprises a processor and a memory as described above. The memory can store instructions executable by the processor such that the processor is programmed to detect an object in contact with the steering wheel 202 of a vehicle 102. For example, a steering wheel contact sensor 208 as described above may provide data to the computer to detect an object in contact with the steering wheel, and/or the object could be detected using image recognition techniques. Initially, the computer may detect the object in contact with the steering wheel 202 via a steering wheel sensor, e.g., a contact sensor 208 such as a capacitive sensor or the like, as described above. Upon detecting the object in contact with the steering wheel, the computer then may acquire images of the steering wheel 202 at various angles of rotation to identify a type of the object, e.g., a human hand or a foreign object.

In one example, a machine learning program is used to identify an object (including determining a type of the object) in contact with the steering wheel 202. For example, a deep neural network such as a convolutional neural network could be trained to, based on an input image of a steering wheel 202, output an angle of rotation of the steering wheel 202 and/or that an object is in contact with the steering wheel 202. A DNN could be trained with training images for a representative vehicle 102 (e.g., a vehicle 102 representative of one or more of a make, model, year, trim level, etc.) to recognize various object types and/or angles of rotation. Further, the steering wheel 202 could include a "landmark," i.e., a visual indicium or marking positioned or placed at a predetermined location on the steering wheel 202 for detection in camera 206 images. The DNN could further be trained with training images in which a landmark was present and identified.

The computer 104 could obtain images at respective angles of rotation of the steering wheel 202 in various ways.

For example, the computer 104 could obtain first and second images at first and second times, and could then determine that the steering wheel 202 was at first and second angles of rotation at the first and second times. Alternatively or additionally, a steering wheel 202 torque sensor 106 could provide steering wheel 202 angles at respective first and second times at which first and second images of the steering wheel 202 are obtained. Example first and second angles of rotation are shown in FIGS. 4A and 4B, respectively. An advantage of analyzing first and second images at respective first and second angles of rotation is that, if a camera 206 field of view 210 does not encompass an entirety of a steering wheel 202, analyzing images at respective angles of rotation can allow the camera 206 to view more if not all of the steering wheel 202. For example, if a human operator is gripping a steering wheel 202 but outside a field of view 210 of a camera 206 at a first angle of rotation, the hand of the human operator may be detected on the steering wheel 202 at a second angle of rotation. Yet further, even if a camera 206 field of view 210 does encompass an entirety of a steering wheel 202, analyzing images at respective angles of rotation can allow the camera 206 to input the respective images to a DNN for more accurate output. That is, a DNN could be trained to accept as first and second input images (or more than two input images), and respective angles of rotation, and to then output that an object is detected and a type of the object.

A type of an object contacting the steering will can be identified based on at least one of the first image or the second image, e.g., as one of a human hand or a foreign object. A "type" of object means a classification or categorization of an object that indicates a source or origin of the object. For example, output object types could be one of a human hand or a foreign object. In another example, output object types could be one of a human hand, other organic matter (e.g., a piece of fruit), a manufactured device, etc.

The computer 104 can be further programmed to control a vehicle 102 component 108 based on the type of object. For example, if possible classifications are human hand versus foreign object, the computer 104 could be programmed to control the vehicle 102 component 108, e.g., a haptic output actuator in the steering wheel 202 or steering column 204, based upon detecting a foreign object. Alternatively or additionally, computer 104 could be programmed to control a vehicle 102 component 108 such as steering, propulsion, or breaking upon detecting a foreign object.

The computer 104 could be further programmed to identify the type of the object based on a depth estimate of the object. That is, a depth estimate of an object provides three-dimensional data that could be provided to a DNN to improve identification of the object and an object type. Depth data, or a depth estimate, means depth data means a range (or distance) between the camera 206 a sensor 106 such as a camera 206 and a surface of an object within the field of view 210 of the sensor 106. It will therefore be appreciated that depth data could be obtained via a camera 206, e.g., a red-green-blue-depth (RGB-D) camera 206 that includes detection at infrared wavelengths in addition to visible light wavelengths. Alternatively or additionally, time-of-flight cameras 206 could be used. Yet further alternatively or additionally, depth data could be obtained via other sensors 106, such as a lidar or a radar. Depth data or a depth estimate in an image that includes capture of the visible light spectrum as well as infrared data means that for a given pixel x, y location in an image, an RGB image will include the color of a location and further depth data will include a distance or range to the same location. Alternatively, depth data, e.g., from a lidar or radar, could include distances or ranges to points on a detected object. Yet further alternatively or additionally, the various sensor modalities, e.g., data from a lidar, a radar, visible light camera and/or infrared camera could be combined, i.e., a sensor fusion technique could be used. For example, where RGB-D (red-green-blue-depth) cameras 206 are used, depth and color intensity data could be combined. That is, in addition to using a depth map, the computer 104 could detect edges or bounding boxes for objects in a camera 206 image. For example, a suitable image recognition technique in which image data is input to a convolution on neural network or the like could be used. Alternatively or additionally, a vehicle 102 could include an interior radar sensor 106. In a sensor fusion technique, data from different sensor modalities could be used to generate respective predictions of a type of object on a steering wheel 202, and the respective predictions could be compared or combined. For example, the computer 104 could require that a prediction of an object type be made based on data from at least two sensor modalities. Yet further, image or depth data could be combined with other kinds of data, e.g., data from a torque sensor 106 for a steering wheel 202. In such an example, the computer 104 could require an indication of a foreign object type contacting the steering wheel 202 in combination with the torque sensor 106 outputting that an applied torque to the steering wheel 202 is zero or at least below a specified threshold empirically determined to indicate that the torque sensor is likely detecting noise rather than a torque being applied to the steering wheel 202.

Depth data can be used to generate a depth map, which is a set of data specifying a 3D (three-dimensional) locations of points in an image. For example, a depth map may include a set of 3D coordinates for respective pixels of a received camera 206 image, e.g., with respect to a coordinate system for a vehicle 102 interior including a lens of a camera 206 so that depths can be specified as distances from the camera 206, e.g., to a steering wheel 202, object contacting the steering wheel 202, etc. In other words, a depth map provides 3D location coordinates of real-world surface points represented in respective pixels of the image. The computer 104 may be programmed, using suitable computer 104 vision techniques, to generate a depth map for an image of a field of view 210 of a camera 206. Further, the computer 104 may be programmed to generate a depth map by processing image data received from two or more cameras 206 at different locations in an interior of a vehicle 100 from different locations but that have overlapping fields of view 210.

Yet further, other techniques for generating a depth map may include use of a camera 206 capable of detecting light fields, use of photometric stereo methods, or monocular depth estimation techniques which typically utilize a neural network based transformation of 2D image data. For example, the computer 104 could be further programmed to obtain the depth estimate of the object by determining a map of surface normals of the steering wheel 202 (and/or any object(s) in contact therewith such as an occupant's hand and/or a foreign object) from a stereo image that combines the first image and the second image. Note that the stereo image, i.e., a pair of images that is the first image and the second image, could be obtained with a first and second camera 206, or could be obtained from a single stereo camera 206. A suitable photometric technique, i.e., that generates a map of surface normals, by varying lighting in an environment such as a vehicle 102 cabin 200 to obtain surface normals of the steering wheel 202, hand, and/or foreign object. Surface normals are vectors perpendicular to respective surfaces represented in pixels on an image. Each vector is a three-dimensional spatial vector normal, i.e., orthogonal or perpendicular, to a small portion of a surface of an object, e.g., a steering wheel 202, and the vectors thereby define the orientation of the surfaces of the object. The vectors may be unit vectors that are unitless. The vectors are mapped to a position in an image of the field of view 210 of a camera 206. The computer 104 can then uses photometric stereo techniques, as just mentioned. Further, when an object on a steering wheel 202 moves with the steering wheel 202, comparing depth maps from respective images could allow suitable techniques to be applied to determine a structure of the object.

The computer can be further programmed to identify the type of the object based at least in part on data from a steering wheel torque sensor. For example, a DNN could be trained with steering wheel torque data collected by operating a vehicle with various types of objects contacting a steering wheel while a vehicle is operated at various speeds and under various road conditions (e.g., paint, dirt, bumpy, highway, city street, etc.). The training data could be used to train the DNN to output a prediction of a type of object contacting the steering wheel 202. The prediction of a type of object output by the DNN could be subjected to a confidence determination, wherein the output is used only if it exceeds a confidence threshold. For example, for individual pixels in an image, a DNN could be trained to provide three outputs each having values between zero and one inclusive, the three outputs representing a likelihood that a pixel represents respective different objects, in this example, a human hand, a foreign object, or a background object (such as a vehicle steering wheel or instrument panel). A zero value in this example means that the pixel is determined not to represent the object represented by the output, and a one means that the pixel is determined to represent the object, with intermediate values indicating a likelihood, e.g., 0.6 represents a 60 percent likelihood, that the pixel represents the object. Any suitable technique for determining appropriate thresholds for one or more of the outputs for determining an object type could be used, e.g., ROC Curves and Precision-Recall curves.

The computer 104 could be further programmed to control the vehicle 102 component 108 based on data about a current user of the vehicle 102, such as eye gaze data or driving style data. For example, the vehicle 102 could include a suitable eye gaze detection system 100 that provided to the computer 104 and indication of whether an operator's gaze was directed to an operating surface (e.g., a road) of the vehicle 102 or whether the operator was gazing in some other direction. In determining whether to control a vehicle 102 component 108, such as a message output, slowing the vehicle 102, limiting speed of the vehicle 102, etc., the computer 104 could implement a rule to control the vehicle 102 component 108 depending on the operator's eye gaze. For example, if the operator's eye gaze were determined to be in a forward direction toward a road on which the vehicle 102 is traveling, and no foreign object is detected on the steering wheel 202, the computer 104 could implement a rule to suppress control of a vehicle 102 component 108. Alternatively or additionally, the computer 104 could be programmed to suppress control of the vehicle 102 component 108 if an operator's eye gaze were determined to be in a forward direction of a direction of travel, and no foreign object is detected on the steering wheel 202, and, moreover, the operator's hands are detected to be off the steering wheel 202 for no more than a specified amount of time, e.g., five seconds.

Alternatively or additionally, operator profile data could be taken into account in determining whether to control a vehicle 102 component 108 based on a type of object contacting the steering wheel 202. For example, operator profile could be stored in a memory of the vehicle 102 computer 104, and an operator could be identified in the vehicle 102, e.g., using any suitable techniques such as an operator login via a portable device, facial recognition or other biometric identification, etc. The operator profile could include an operator age, etc.

Figure 5:
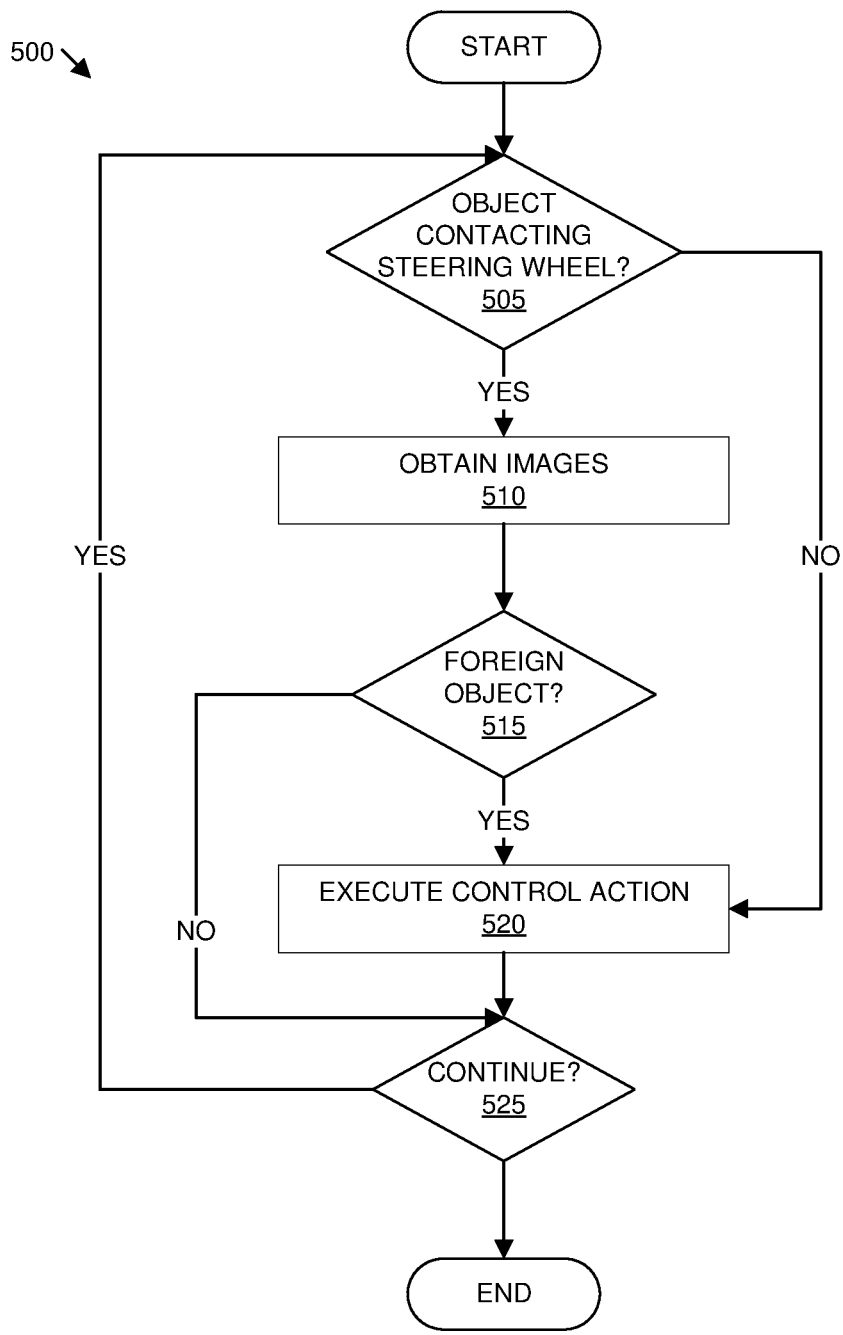
FIG. 5 is a process flow diagram illustrating an example process for operating the steering wheel object contact detection system.

FIG. 5 is a process flow diagram illustrating an example process 500 for operating the steering wheel 202 object contact detection system 100. The process 500 can begin in a block 505, e.g., after a vehicle 102 is put in an ON state, or in a "drive" state to operate on a roadway, etc. In the block 505, the computer 104 determines whether an object is in contact with the steering wheel 202. If not, the process 500 proceeds to a block 520. If an object is detected, e.g., by the contact sensor 208, as being in contact with the steering wheel 202, then a block 510 is executed next.

In the block 510, the computer 104 obtains images, at least first and second images, of the steering wheel 202 at respective angles of rotation. As mentioned above, the images may be obtained from a same camera 206 or two or more different cameras 206 in the vehicle 102.

Next, in a block 515, the computer 104 determines whether an object contacting the steering wheel 202 is a foreign object. Any suitable technique could be used. For example, as described above, based on inputting at least two images at respective angles of rotation of the steering wheel 202 to a DNN, the computer 104 may obtain output indicating a type of object contacting the steering wheel 202, e.g., a foreign object or a human hand. If a foreign object is detected, then the process 500 proceeds to the block 520. Otherwise, the process 500 proceeds to a block 525.

In the block 520, the computer 104 may cause a control action to be initiated or actuated in the vehicle 102. For example, as described above, when the block 520 follows the block 515, meaning that a foreign object is detected contacting the steering wheel 202, then the computer 104 may provide output such as a message displayed on an HMI 112, haptic output to steering wheel 202, etc. Yet further, the computer 104 could take an action such as limiting a vehicle 102 speed, disabling a vehicle 102 features such as speed control, etc. Moreover, the block 520 may be visited following the block 505 because no object is detected contacting the steering wheel 202, e.g., it is determined that an operator's hands are not on the steering wheel 202. In this situation, the computer 104 could likewise implement control actions such as audible or visual output, haptic output, controlling vehicle 102 steering, speed, etc. Yet further, control of the vehicle 102 component 108 could be based at least in part on data about a current user (or operator) of the vehicle 102, such as eye gaze data or operator profile data.

Following the block 520, the computer 104 may determine whether to continue the process 500 area for example, a vehicle 102 could transition to a solely manual mode, i.e., a mode in which vehicle 102 operation is only possible by an operator contacting the steering wheel 202, the vehicle 102 could be powered off, etc. however, if it is determined that the process 500 is not the end, the process 500 may return to the block 505; else, the process 500 ends following the block 525.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The adjectives first and second are used throughout this document as identifiers and, unless explicitly stated otherwise, are not intended to signify importance, order, or quantity.

The term exemplary is used herein in the sense of signifying an example, e.g., a reference to an exemplary widget should be read as simply referring to an example of a widget.

Use of in response to, based on, and upon determining herein indicates a causal relationship, not merely a temporal relationship.

Computer executable instructions may be compiled or interpreted from computer programs created using a variety of programming languages and/or technologies, including, without limitation, and either alone or in combination, Java, C, C++, Visual Basic, Java Script, Perl, Python, HTML, etc. In general, a processor e.g., a microprocessor receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random access memory, etc. A computer readable medium includes any medium that participates in providing data e.g., instructions, which may be read by a computer. Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

The invention claimed is:

1. A system, comprising a processor and a memory, the memory storing instructions executable by the processor such that the processor is programmed to:
    detect an object in contact with a steering wheel of a vehicle;
    obtain a first image of the steering wheel at a first angle of rotation and a second image of the steering wheel at a second angle of rotation;
    identify a type of the object, based on at least one of the first image or the second image, as one of a human hand or a foreign object; and
    control a vehicle component based on the type of object.

2. The system of claim 1, wherein the processor is further programmed to identify the type of the object based on a depth estimate of the object.

3. The system of claim 2, wherein the processor is further programmed to obtain the depth estimate of the object by determining a surface normal of the steering wheel by combining the first image and the second image.

4. The system of claim 1, wherein the processor is further programmed to identify the type of the object based on data from one or both of a steering wheel torque sensor and a potentiometer.

5. The system of claim 1, wherein the processor is further programmed to control the vehicle component based on data about a current user of the vehicle.

6. The system of claim 1, wherein the data about the current user of the vehicle is eye gaze data.

7. The system of claim 1, wherein the data about the current user of the vehicle is operator profile data.

8. The system of claim 1, wherein the processor is further programmed to receive the first image provided from a first camera and the second image provided from a second camera.

9. The system of claim 1, wherein at least one of the first image or the second image is provided from a radar.

10. The system of claim 1, wherein at least one of the first image or the second image is provided from a lidar.

11. The system of claim 1, further comprising a contact sensor arranged to provide a signal indicating that the object is in contact with the steering wheel.

12. The system of claim 1, wherein the processor is further programmed to, upon identifying the type of object as the human hand, control the vehicle component based on a position of the human hand with respect to a landmark on the steering wheel.

13. The system of claim 1, wherein the processor is further programmed to identify the type of the object based on both of the first image and the second image.

14. A method, comprising:
    detecting an object in contact with a steering wheel of a vehicle;
    obtaining a first image of the steering wheel at a first angle of rotation and a second image of the steering wheel at a second angle of rotation;
    identifying a type of the object, based on at least one of the first image or the second image, as one of a human hand or a foreign object; and
    controlling a vehicle component based on the type of object.

15. The method of claim 14, further comprising identifying the type of the object based on a depth estimate of the object.

16. The method of claim 15, further comprising obtaining the depth estimate of the object by determining a surface normal of the steering wheel by combining the first image and the second image.

17. The method of claim 14, further comprising identifying the type of the object based on data from one or both of a steering wheel torque sensor and a potentiometer.

18. The method of claim 14, further comprising controlling the vehicle component based on data about a current user of the vehicle.

19. The method of claim 14, further comprising receiving the first image from a first camera and the second image from a second camera.

20. The method of claim 14, further comprising identifying the type of the object based on both of the first image and the second image.

* * * * *